3,410,865
5-SUBSTITUTED DERIVATIVES OF DITHIOHYDANTOIN

John H. Cornell, Jr., Arlington, Mass., assignor to Monsanto Research Corporation, St. Louis, Mo., a corporation of Delaware
No Drawing. Filed Feb. 25, 1966, Ser. No. 529,921
2 Claims. (Cl. 260—309.5)

ABSTRACT OF THE DISCLOSURE

New compounds of the formula:

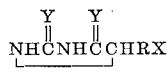

where Y is sulfur, R is a bivalent hydroxy phenylene radical attached to the heterocyclic structure by means of a ring carbon atom and X is a halogen element of atomic weight below 130. 5-(5-chloro-2-hydroxyphenyl)-2,4-dithiohydantoin is exemplary of the compounds claimed. The compounds are useful as biological toxicants, bactericides and mammalian toxicants.

---

This invention relates to the reaction of halohydroxyaryl aldehydes and alkali metal cyanides with an ammonium salt both in the presence of or absence of carbon disulfide and to the products thereof.

It is an object of this invention to provide new and useful 5-substituted halohydroxyaryl derivatives of hydantoin and 2,4-dithiohydantoin.

It is another object of this invention to provide compounds useful as biological toxicants such as pesticides, bactericides and mammalian toxicants.

According to the invention there are prepared new and useful compounds of the formula:

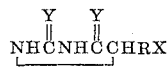

wherein Y represents a member selected from the group consisting of oxygen and sulfur, R represents bivalent hydroxy substituted aryl radicals of from 6 to 12 carbon atoms attached to the heterocyclic structure by means of a ring carbon atom and X represents a halogen element of atomic weight below 130.

The novel 5-substituted hydantoin and 2,4-dithiohydantoins may be prepared in a variety of ways. One preferred method for preparing the 5-substituted hydantoins is by the Bücherer synthesis, wherein the desired aldehyde is contacted with the alkali metal cyanide to form the corresponding cyanohydrin and then treated with ammonium carbonate to form the novel 5-substituted hydantoin compounds, according to the following equation:

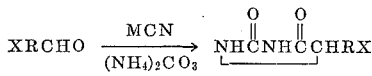

wherein R and X are as defined above and M represents a member selected from the group consisting of sodium and potassium.

A preferred method for preparing the 5-substituted 2,4-dithiohydantoins is by contacting the desired aldehyde with ammonium cyanide (or a mixture of salts capable of reacting as such) followed by treatment with carbon disulfide to form the novel 5-substituted 2,4-dithiohydantoins, according to the following equation:

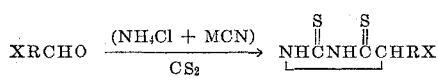

wherein R, X and M are as defined above.

There are shown below a number of the specific new compounds of this invention. It is not intended that this be a complete listing of all the compounds of the invention, but that it merely be illustrative thereof:

5-(2-bromo-3-hydroxyphenyl)-hydantoin,
5-(5-chloro-2-hydroxyphenyl)hydantoin,
5-(6-bromo-3-hydroxytolyl)hydantoin,
5-(4-fluoro-6-hydroxyxylyl)hydantoin,
5-(3-hydroxy-5-iodomesityl)hydantoin,
5-(3-chloro-4-hydroxycumenyl)-hydantoin,
5-(6-bromo-3-ethyl-2-hydroxyphenyl)hydantoin,
5-(2-ethyl-4-hydroxy-5-iodophenyl)hydantoin,
5-(2-chloro-4-hydroxy-6-propylphenyl)hydantoin,
5-(2-bromo-4-hydroxynaphthyl)hydantoin,
5-(2-fluoro-5-hydroxybiphenylyl)hydantoin,
5-(5-chloro-2-hydroxyphenyl)-2,4-dithiohydantoin,
5-(3-hydroxy-5-iodotolyl)-2,4-dithiohydantoin,
5-(6-fluoro-3-hydroxytolyl)-2,4-dithiohydantoin,
5-(6-fluoro-4-hydroxyxylyl)-2,4-dithiohydantoin,
5-(3-bromo-5-hydroxyxylyl)-2,4-dithiohydantoin,
5-(3-chloro-5-hydroxymesityl)-2,4-dithiohydantoin,
5-(2-hydroxy-5-iodocumenyl)-2,4-dithiohydantoin,
5-(2-ethyl-3-fluoro-5-hydroxyphenyl)-2,4-dithiohydantoin,
5-(3-bromo-5-hydroxy-2-propylphenyl)-2,4-dithiohydantoin,
5-(2,5-dipropyl-4-hydroxy-3-iodophenyl)-2,4-dithiohydantoin,
5-(5-chloro-6-hydroxynaphthyl)-2,4-dithiohydantoin,
5-(3-hydroxy-5-iodobiphenylyl)-2,4-dithiohydantoin, and so forth.

In preparing compounds of this invention, halohydroxyaryl aldehydes which may be used are, for example:

3-chlorosalicylaldehyde,
5-bromocresotaldehyde,
5-bromo-4,6-dimethylsalicylaldehyde,
5-iodo-3,4,6-trimethylsalicylaldehyde,
3-chloro-5-propylsalicylaldehyde,
4-ethyl-3-fluorosalicylaldehyde,
5-butyl-3-chlorosalicylaldehyde,
5-iodo-3,4,6-triethylsalicylaldehyde,
3-iodo-4-methyl-6-pentylsalicylaldehyde,
2-bromo-3-hydroxynaphthaldehyde,
2-hydroxy-3-iodobiphenylaldehyde, and so forth.

The new compounds of this invention may be prepared by simply contacting the desired aldehyde with the alkali metal cyanide and ammonium carbonate or alkali metal cyanide, ammonium chloride and carbon disulfide until reaction is complete. It is an advantage in moderating the reaction to add one of the reactants slowly and gradually to the other, though the reactants may be mixed all at once, together with a solvent or diluent if desired.

Solvents or diluents which may be used to moderate the reaction and/or to facilitate stirring the mixture, and so forth, are for example, water and alcohol solutions, such as water and methanol, water and ethanol and water and propanol. Molar ratios of the reactants may vary. Generally, the molar ratio of aldehyde to ammonium salt to cyanide compound in the case of the hydantoin compound may vary from 1:10:10 to 10:1:1. In the case of the dithiohydantoin the molar ratio of aldehyde to ammonium salt to cyanide to carbon disulfide may vary from 1:10:10:10 to 10:1:1:1. However, since the reaction is equimolar a 1:1:1 ratio is preferred. A molar ratio for the aldehyde to cyanide to ammonium compound of 1:2:4 is preferred in preparing the hydantoin compounds. It is an advantage in obtaining higher yields to add an excess of one of the reactants, excess reactant may then be removed at the end of the reaction by, for example, extraction or distillation.

Useful temperatures for preparing the novel compounds are, for example, the reflux temperature of the reaction mixture where low boiling solvents are employed, or from any desired temperature from just above the freezing point to just below the decomposition point of the ingredients of the reaction mixture. However, a reaction temperature ranging from about ambient temperature up to not exceeding 60° C. is preferred. No catalyst is needed. Atmospheric pressure is satisfactory for conducting the reaction, though sub- or super-atmospheric pressures may be used if desired, ranging from 0.05 millimeters of mercury up to about 5,000 pounds per square inch. Reaction time may vary. In general, it will depend on the nature of the reactants used and on the temperature of the reaction. Ordinarily reaction time will vary from less than one minute to several hours. Isolation of the product may be accomplished by standard procedures, such as distillation, extraction or crystallization for example.

The novel compounds provided by this invention are generally stable, well defined products useful for a wide variety of industrial and agricultural uses, for example, both 5-(5-chloro-2-hydroxyphenyl)hydantoin and 5-(5-chloro-2-hydroxyphenyl)-2,4-dithiohydantoin are effective as bactericides and insecticides.

This invention will be further described with reference to the following specific examples. These examples are given for purposes of illustration only and are not to be taken as in any way restricting the invention.

Example 1

This example illustartes the preparation of a compound in accordance with this invention.

To a reaction flask containing 27 grams (g.) (about 0.5 mole) of sodium cyanide in 300 milliliters (ml.) of methanol are added 78 g. (about 0.5 mole) of 5-chlorosalicylaldehyde, 38 g. (about 0.5 mole) of carbon disulfide and a solution containing 27 g. (about 0.5 mole) of ammonium chloride in 300 ml. of water. The temperature of the reaction mixture is maintained below 30° C. during addition. The reaction mixture is then refluxed for 21 hours at a temperature of 50°–55° C. and filtered. The filtrate is treated to lower its pH to 5.0, causing a precipitate to form, and then partially evaporated. The remaining mixture is flash evaporated to yield an orange solid which is washed by boiling it in both water and methanol.

The resultant solid is 5-(5-chloro-2-hydroxyphenyl)-2,4-dithiohydantoin, a uniformly orange crystalline product melting at 255°–259° C.

Elemental analysis of this product confirms the assigned empirical formula: $C_9H_7ClN_2OS_2$

| Element | Percent calculated | Percent found |
| --- | --- | --- |
| C | 41.7 | 42.0 |
| H | 2.7 | 2.4 |
| N | 10.8 | 10.5 |

Example 2

This example further illustrates the preparation of a compound in accordance with this invention.

To a reaction flask containing a mixture consisting of 228 g. (about 2.0 moles) of ammonium carbonate and 65 g. (about 1.0 mole) of potassium cyanide in 600 ml. of water is added a solution consisting of 73.3 g. (about 0.5 mole) of 5-chlorosalicylaldehyde dissolved in 95% ethanol. The reaction mixture is stirred for two hours at a temperature ranging from 50° to 60° C. The reaction temperature is maintained so as not to exceed 60° C. After this period the reaction mixture is cooled to room temperature and filtered.

The resultant product is 5-(5-chloro-2-hydroxyphenyl)hydantoin, a uniformly brownish-yellow crystalline solid melting at 255°–257° C.

Elemental analysis of this product confirms the assigned empirical formula $C_9H_7ClN_2O_3$:

| Element | Percent calculated | Percent found |
| --- | --- | --- |
| C | 47.7 | 47.9 |
| H | 3.1 | 3.0 |
| N | 12.4 | 12.1 |

Example 3

This example illustrates the use of compounds of this invention as pesticides.

In insecticidal screening, activity for control of mosquito larvae is demonstrated as follows. 5-(5-chloro-2-hydroxyphenyl)hydantoin and 5-(5-chloro-2-hydroxyphenyl)-2,4-dithiohydantoin are each individually mixed with 50 ml. of water and 0.5 ml. of acetone to provide 10 parts per million concentration of the test compound in the liquid. Some twenty early fourth-instar yellow fever mosquito larvae (Aedes aeygpti) are placed into each container holding the solution of the test compounds and held there at room temperature for 24 hours. Now 0.1 ml. of a mixture of three standard insecticides (of the chlorinated hydrocarbon, carbamate and organic phosphorous type, respectively) in acetone, which in itself would produce about a 5% mortality rate in the larvae, is added to each of the solutions.

Within another 24 hours a 40% mortality occurs in the mixture containing the hydantoin compound, while an 80% mortality occurs in the mixture containing the dithiohydantoin compound.

Example 4

This example illustrates the use of compounds of this invention for controlling the growth of microbiological organisms.

To test bactericidal activity 5-(5-chloro-2-hydroxyphenyl)hydantoin and 5-(5-chloro-2-hydroxyphenyl)-2,4-dithiohydantoin are each individually added to agar substrates which will support bacterial growth. The agar is then inoculated with the specimen microorganisms and maintained under conditions supporting their growth.

At a one part per thousand concentration in the agar, the hydantoin compound causes substantially complete suppression of growth and reproduction of *S. typhosa*, while the dithiohydantoin compound causes substantially complete suppression of growth and reproduction of both *S. aureus* and *S. typhosa*.

Example 5

This example illustrates the use of a compound of this invention as a mammalian toxicant.

5-(5-chloro-2-hydroxyphenyl)-2,4-dithiohydantoin, the product of Example 1, is placed in solution by dissolving 100 milligrams of the compound in 10 ml. of water. This solution is diluted with water to provide liquids of varying concentrations which are injected into mice intravenously. At rates of 316 milligrams per kilogram (mg./kg.) (31.6 ml./kg.) the specimen mice are killed. While at the lower rate of 31.6 mg./kg. (3.16 ml./kg.) the mice exhibit increased respiratory depth, nonparalytic eyelid ptosis and decreased activity.

The new compounds of this invention are generally applied for toxicant use in the form of sprays or aerosols. Useful sprays may be prepared by dispersing the present products in water with the aid of a wetting agent, to prepare aqueous dispersions which may be employed as by sprays. For example, a solution containing cyclohexanone and a polyalkylene glycol ether long chain alkyl-benzene sulfonate emulsifier may be used to prepare such dispersions or emulsions. The products may also be applied to plants as oil-in-water emulsion sprays. The present products may also be dispersed or dissolved in liquefied gasses such as fluorochloroethanes or methyl chloride and applied to plants or pest species from aerosol bombs. Instead of employing liquids as carriers and diluents, herbicidal dusts which contain the present novel compounds as active ingredients may be prepared, for example, by incorporating the new products of this invention with a solid carrier such as talc, bentonite, fuller's earth, and so forth.

The concentration of the toxicant compounds in the composition as applied will vary with the active ingredients, the manner of application, the species to be destroyed and the resistance of the organism to be sprayed, for example, and formulation and ratio of application are suitably adjusted in accordance with these factors.

It is apparent that this invention may be extended to areas beyond those specifically described and that many widely differing embodiments can be made without departing from the spirit and scope thereof as defined herein. Therefore, it is not intended to be limited except as indicated by the appended claims.

What is claimed is:
1. A compound having the formula:

where Y is sulfur, R is a bivalent hydroxy phenylene radical attached to the heterocyclic structure by means of a ring carbon atom and X is a halogen element of the atomic weight below 130.

2. 5-(5-chloro-2-hydroxyphenyl)-2,4 dithiohydantoin.

References Cited

Bognar et al. I Chem. Abst. vol. 62, col. 4105 (Feb. 15, 1965).

Bognar et al. II Index Chemicus vol. 15, No. 7 Item No. 46930 (1964).

HENRY R. JILES, *Primary Examiner.*

N. TROUSOF, *Assistant Examiner.*